US010891505B2

(12) United States Patent
Escobar et al.

(10) Patent No.: US 10,891,505 B2
(45) Date of Patent: *Jan. 12, 2021

(54) BIDIRECTIONAL ENTRY VESTIBULE FOR AIRCRAFT PASSENGER REST CABINS

(71) Applicant: Rockwell Collins, Inc., Cedar Rapids, IA (US)

(72) Inventors: Art M. Escobar, Seattle, WA (US); Randall S. Weaver, Bremerton, WA (US); Jefferey M. McKee, Duvall, WA (US); Ron Moss, Camano Island, WA (US); Travis J. Vaninetti, Bothell, WA (US); R. Klaus Brauer, Seattle, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,035

(22) Filed: Sep. 10, 2018

(65) Prior Publication Data

US 2020/0184240 A1    Jun. 11, 2020

Related U.S. Application Data

(63) Continuation-in-part of application No. 15/993,310, filed on May 30, 2018, now Pat. No. 10,452,934, (Continued)

(51) Int. Cl.
*B64D 11/00* (2006.01)
*G06K 9/00* (2006.01)
(Continued)

(52) U.S. Cl.
CPC ...... *G06K 9/00845* (2013.01); *B64D 11/0015* (2013.01); *G02B 1/11* (2013.01);
(Continued)

(58) Field of Classification Search
CPC ............ B64D 11/00; B64D 2011/0076; B64D 2011/0046; B64D 11/003; B64D 2011/0069; B64D 2011/0084
See application file for complete search history.

(56) References Cited

U.S. PATENT DOCUMENTS 6,073,883 A    6/2000  Ohlmann et al.
6,182,926 B1 *  2/2001  Moore ............... B64D 11/00
                                                        244/118.5
(Continued)

FOREIGN PATENT DOCUMENTS

WO         2019207211 A1    10/2019
WO    WO-2019207211 A1 *  10/2019  ............ B64D 11/00

OTHER PUBLICATIONS

International Search Report and Written Opinion dated Mar. 23, 2020 for PCT/US2019/050337.

*Primary Examiner* — Richard G Davis
(74) *Attorney, Agent, or Firm* — Suiter Swantz pc llo

(57) ABSTRACT

A bi-directional entry vestibule for a passenger aircraft provides passenger access to overhead rest cabins and lower-lobe rest cabins (e.g., on a lower cargo deck) via separate enclosed chambers incorporating ascending and descending staircases respectively. The ascent and descent chambers may be accessed from the main passenger cabin via access doors (one door or separate doors); the ascending and descending access doors may be on opposing sides of the aircraft (e.g., accessible from port-side and starboard-side aisles) or adjacent to each other and accessible via the same aisle. The ascent chamber may include a further transitional space transitioning into an overhead corridor-based cabin, the transitional space including a crew station comprising a fold-down jump seat, communications equipment, and emergency supply storage.

14 Claims, 13 Drawing Sheets

Related U.S. Application Data which is a continuation of application No. 15/382,633, filed on Dec. 17, 2016, now Pat. No. 10,089,544, which is a continuation-in-part of application No. 14/645,526, filed on Mar. 12, 2015, now Pat. No. 9,996,754, and application No. 15/993,310, which is a continuation-in-part of application No. 14/645,526, filed on Mar. 12, 2015, now Pat. No. 9,996,754.

(60) Provisional application No. 62/729,237, filed on Sep. 10, 2018, provisional application No. 62/011,886, filed on Jun. 13, 2014.

(51) Int. Cl.
| | | |
|---|---|---|
| *H04N 7/18* | (2006.01) | |
| *G02B 1/11* | (2015.01) | |
| *G06F 3/00* | (2006.01) | |
| *G06F 3/01* | (2006.01) | |
| *H04N 5/232* | (2006.01) | |
| *G06F 3/14* | (2006.01) | |
| *H04N 5/225* | (2006.01) | |
| *G02B 27/00* | (2006.01) | |

(52) U.S. Cl.
CPC .............. *G06F 3/005* (2013.01); *G06F 3/013* (2013.01); *G06F 3/1446* (2013.01); *G06K 9/00604* (2013.01); *G06K 9/00791* (2013.01); *H04N 5/2253* (2013.01); *H04N 5/23219* (2013.01); *H04N 5/23293* (2013.01); *H04N 5/23296* (2013.01); *H04N 7/181* (2013.01); *B64D 2011/0061* (2013.01); *G02B 27/0006* (2013.01)

(56) References Cited

U.S. PATENT DOCUMENTS

| | | | |
|---|---|---|---|
| 6,305,645 | B1 | 10/2001 | Moore |
| 6,520,451 | B1 | 2/2003 | Moore |
| 6,659,225 | B2 | 12/2003 | Olliges et al. |
| 7,762,496 | B2 | 7/2010 | Seiersen et al. |
| 7,942,367 | B2 | 5/2011 | Saint-Jalmes et al. |
| 8,152,102 | B2* | 4/2012 | Warner .................. B64D 11/00 244/118.2 |
| 8,534,602 | B2 | 9/2013 | Jakubec et al. |
| 8,794,569 | B1 | 8/2014 | Ohlmann et al. |
| 8,991,756 | B2 | 3/2015 | Papke |
| 2010/0140402 | A1* | 6/2010 | Jakubec ................. B64D 11/00 244/118.6 |
| 2011/0139930 | A1* | 6/2011 | Sutthoff ................. B64D 11/02 244/118.5 |
| 2017/0057637 | A1* | 3/2017 | Cole ...................... B64D 11/00 |
| 2017/0137109 | A1 | 5/2017 | Sieben |

* cited by examiner

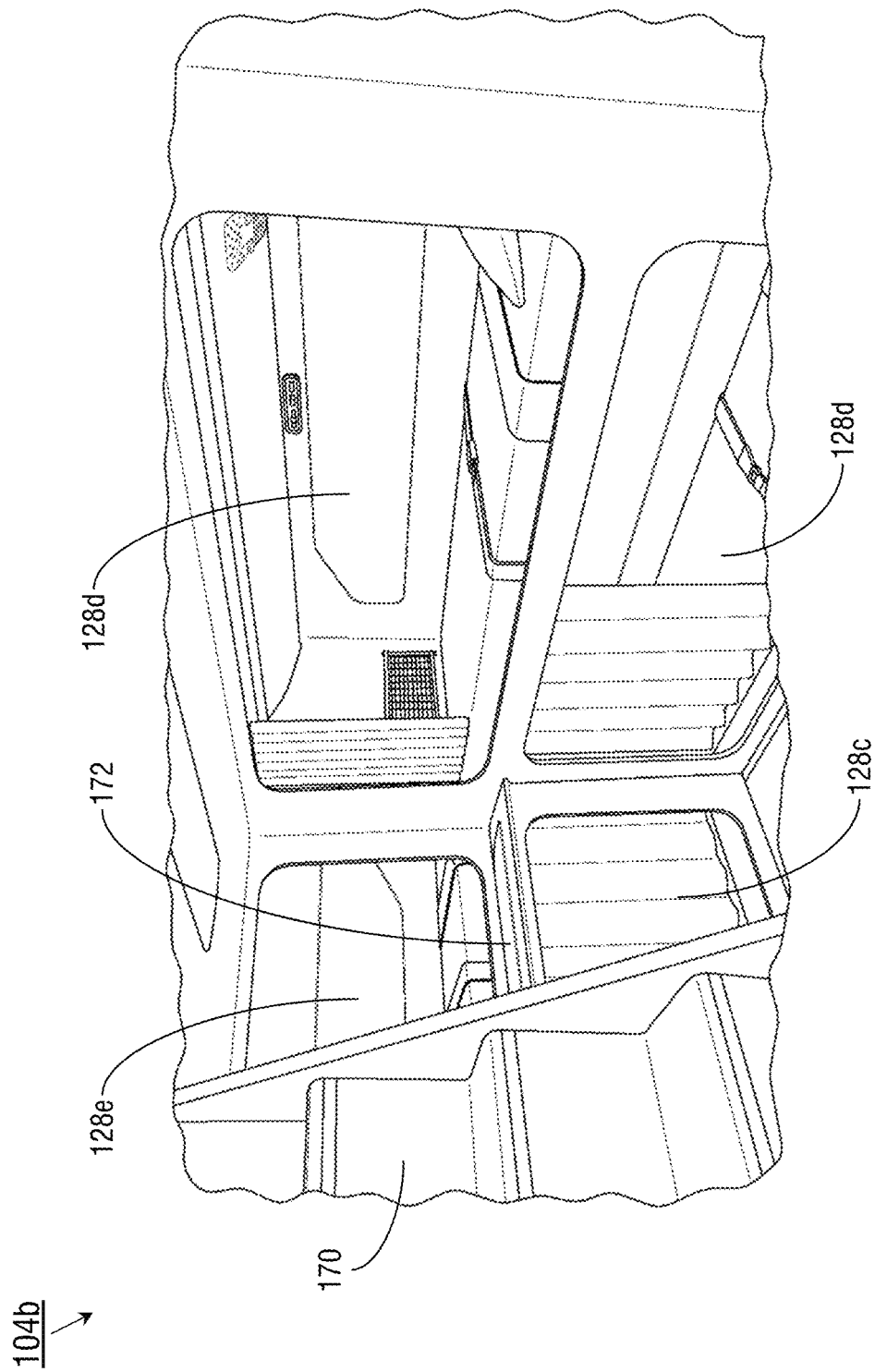

BIDIRECTIONAL ENTRY VESTIBULE FOR AIRCRAFT PASSENGER REST CABINS

CROSS-REFERENCE TO RELATED APPLICATIONS

This application claims the benefit under 35 U.S.C. § 119 and/or 120 of the following U.S. patent applications:
U.S. Provisional Patent Application Ser. No. 62/729,237, filed Sep. 10, 2018;
and
U.S. patent application Ser. No. 15/993,310, filed May 30, 2018, which claims the benefit of:
  a. U.S. patent application Ser. No. 15/382,633 entitled APPARATUS AND METHOD FOR PROVIDING ATTITUDE REFERENCE FOR VEHICLE PASSENGERS and filed Dec. 17, 2016, which claims priority to U.S. patent application Ser. No. 14/645,526 (issued as U.S. Pat. No. 9,996,754) entitled APPARATUS AND METHOD FOR PROVIDING ATTITUDE REFERENCE FOR VEHICLE PASSENGERS and filed Mar. 12, 2015, which claims priority to U.S. Provisional Patent Application No. 62/011,886 filed Jun. 13, 2014; and
  b. U.S. patent application Ser. No. 14/645,526 (issued as U.S. Pat. No. 9,996,754) entitled APPARATUS AND METHOD FOR PROVIDING ATTITUDE REFERENCE FOR VEHICLE PASSENGERS and filed Mar. 12, 2015, which claims priority to U.S. Provisional Patent Application No. 62/011,886 filed on Jun. 13, 2014;
the contents of which above-referenced U.S. patent applications are herein incorporated by reference in their entirety.

BACKGROUND

Passenger aircraft have incorporated onboard crew rest compartments (CRC) for the short-term use of their pilots or crew. CRCs may include lounge chairs or, more commonly, bunks allowing cabin crew to rest in a lie-flat position when not on duty (e.g., on transoceanic or other long-haul flights requiring multiple shifts). However, CRCs are low-capacity, generally providing no more than six to eight bunks at most. Further, CRCs are generally inaccessible to passengers for security reasons, and may be directly accessible from the cockpit only.

Airlines may wish to provide their economy-class passengers, e.g., those passengers occupying seats in the main cabin as opposed to premium lie-flat convertible seats or enclosed compartments such as partitioned seats or suites, with access to bunk facilities comparable to those provided by a CRC for use on similar long-haul flights. Clearly such compartments must meet regulatory requirements for passenger use (e.g., similarly to CRCs, passenger rest compartments may not be used during taxi, takeoff and landing (TTL) flight segments). As an additional challenge, however, airlines must make passenger rest facilities easily accessible to participating passengers from the main cabin (e.g., when the aircraft has reached a safe cruising altitude and passengers are permitted to enter the rest compartments) while minimizing added weight and cabin seating displaced by said means of access.

The incorporation of rest cabins for pilots and crew of an aircraft, and occasionally for passengers as well, includes a variety of approaches. For example, U.S. Pat. No. 5,784,836 discloses a removable sleeping compartment assembly that may nest together several different modules incorporating sleeping berths, restroom facilities, and other convenience features. The modules may have an exterior configuration or form factor similar to that of a cargo container. Entry to the sleeping compartments may be achieved by a pivotable staircase or lift system from the main deck. Additionally, U.S. Pat. Nos. 6,182,926; 6,305,645; and 6,520,451 disclose a variety of configurations for a crew rest station contoured to occupy the overhead space between the curved top hull of the aircraft and the lowered ceiling and providing bunk portions, lavatory facilities, and storage space. The crew rest station may be located in the approximate midsection of the aircraft and accessible via an entry ladder, with forward, aft, or side bunk facilities arranged around a central deck. Further, U.S. Pat. No. 8,991,756 discloses a crew rest station including an overhead crew rest portion with forward and aft bunk portions arranged around a central deck portion. The central deck portion includes an emergency escape hatch, a fold-down jump seat, and a fold-down entry door capable of covering a stairway of a central entry vestibule, via which the overhead crew rest portion may be accessed from the passenger seating area.

SUMMARY

In one aspect, embodiments of the inventive concepts disclosed herein are directed to a bi-directional vestibule for a passenger aircraft. For example, passengers seated in the main passenger cabin may access overhead or lower-lobe passenger rest compartments via access doors off the main aisles. The access doors may be on opposite sides of the aircraft, or adjacent to each other and accessible via the same aisle. An overhead-cabin access door opens to an ascent chamber including an ascending staircase or similar ascent device via which passengers may ascend to an overhead passenger rest cabin, and a lower-lobe cabin access door similarly opens to a descent chamber and descending staircase or descent device, by which passengers may descend to the lower-lobe cabin below the main passenger cabin. Corridor-based cabins (e.g., wherein individual passenger rest compartments may be aligned on either side of a central corridor) may be accessed through a transitional space connecting the ascending or descending staircase with the corridor proper; the staircases and transitional spaces may include handrails for the safety and convenience of ascending or descending passengers.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a partial isometric view of a lower lobe passenger rest cabin of the aircraft of FIG. 1;

DETAILED DESCRIPTION OF EXEMPLARY EMBODIMENTS

Figure 1:
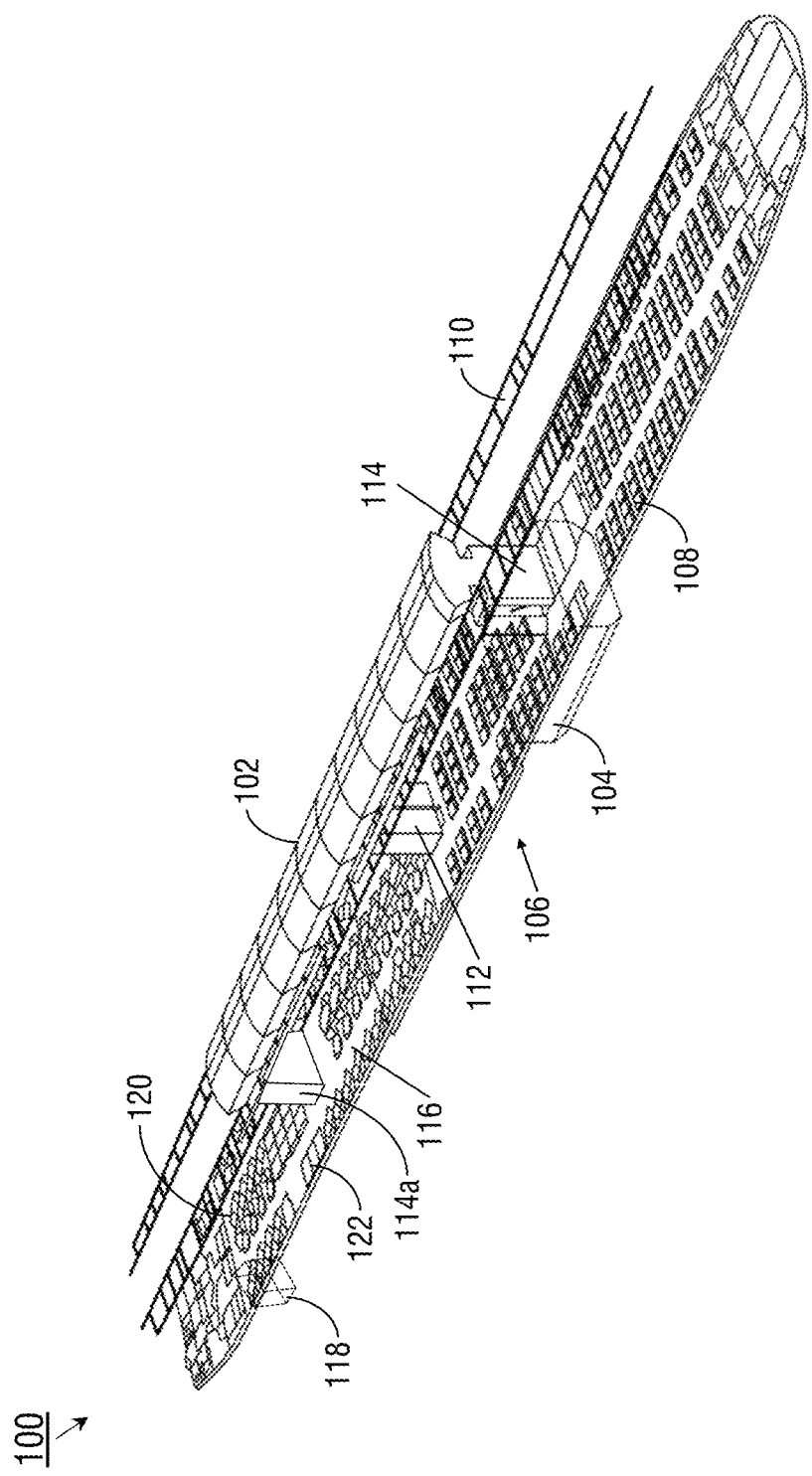
FIG. 1 illustrates an exemplary embodiment of an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger aircraft capable of providing rest compartments for passengers within remote areas of the aircraft. "Remote areas" refers to portions of the aircraft outside the main passenger cabin potentially occupyable by passengers. For example, passenger rest compartments (e.g., berths, bunks) may be incorporated into the overhead crown area of the fuselage, directly above the main passenger cabin. Additionally or alternatively, rest compartments may be incorporated into a lower lobe area under the main passenger cabin, such as a cargo deck. In either case, passenger rest compartments may be incorporated into a larger cabin structure above or below the main passenger cabin and accessible therefrom by passengers, e.g., when the aircraft reaches a safe cruising altitude. Unlike rest cabins dedicated to use by aircraft pilots and cabin crew, the passenger rest cabins may be accessible from the main passenger cabin rather than isolated therefrom. Similarly, the passenger rest cabins and their individual rest compartments may incorporate additional safety features and amenities developed with passenger use in mind.

It is noted herein that an aircraft including an aircraft suite with an overhead passenger rest cabin and a lower lobe passenger rest cabin may be configured to meet or exceed regulatory requirements for crew rest compartments in aircraft as set forth by the Federal Aviation Administration (FAA) of the United States Government. The regulatory requirements may be codified (e.g., including, but not limited to, regulations codified in 14 C.F.R. 25: Airworthiness Standards: Transport Category Airplanes and 14 C.F.R. 117: Flight and Duty Limitations and Rest Requirements: Flight-crew Members). In addition, the regulatory requirement may include special condition regulations set forth for specific aircraft (e.g., including, but not limited to, regulations such as those found in 68 FR 18843: Special Conditions: Boeing Model 777 Series Airplanes; Overhead Crew Rest Compartments, and 79 FR 2359: Special Condition: Airbus Model A350-900 Series Airplane Crew Rest Compartments). Further, the regulatory requirements may be provided in advisory *circulars* (e.g., including, but not limited to, Advisory Circular AC117-1).

It is contemplated that passenger rest compartments will not be occupied by passengers during taxi, takeoff and landing (TTL) flight segments. Rather, passengers will occupy their assigned seats in the main passenger cabin during said flight segments. When the aircraft reaches a safe cruising altitude (e.g., when passengers are generally permitted to leave their seats), those passengers having access to a rest compartment may be permitted to access their assigned rest compartment if they so choose. Passenger access to rest compartments may be via a dedicated vestibule adjacent to one or more central aisles (e.g., adjacent to, and accessible via, both aisles of a double-aisle aircraft). Access doors in the vestibule may lead to compact staircases or similar means of ascent or descent by which passengers may reach the overhead or lower-lobe rest cabins. Each remote area of the aircraft wherein rest cabins are incorporated (e.g., the overhead crown area or lower-lobe cargo deck) may have a dedicated ascent/descent device, such that the progress of passengers wishing to ascend into an overhead cabin is not obstructed by that of passengers wishing to descend into the lower lobe area. Rest cabins may incorporate a transitional space or landing between the ascent/descent staircase and the individual bunks, which space may include a station space where flight attendants and crew may access emergency equipment storage (e.g., first aid supplies, fire containment bags) and communications facilities. Alternatively, the transitional space may include temporary seating facilities for an on-site crewmember, proximate to storage and facilities. The transitional space may temporarily accommodate a passenger entering or leaving the rest cabin. It is contemplated that under normal conditions, one or more cabin crewmembers may be dedicated to monitoring the rest cabins inflight; however, said crewmembers may remotely monitor the rest cabin from the main deck (e.g., via the aforementioned sensor system), responding to the rest cabin if their attention is required as described below. A flight attendant/crew station as described above may be positioned at either vertical end of a bidirectional entry vestibule, e.g., at the respective entrances to the overhead passenger rest cabin (at its aft end) and the lower lobe rest cabin. Additional crew stations may be positioned, e.g., at the opposing forward end of the overhead passenger rest cabin and in the portion of the lower lobe rest cabin most distant from the entry station. For example, additional lower lobe rest stations may be positioned at the opposing end of a corridor passing through a single lower lobe rest cabin module, or at the point of transition between two adjacent lower lobe rest cabin modules. In some embodiments, a second entry vestibule may be positioned at the forward or terminal end of the overhead passenger rest cabin, via which passengers and crew may enter or exit the overhead passenger rest cabin.

Each rest cabin may include additional access hatches for the emergency use of passengers or crew. Should the aircraft encounter severe turbulence or other adverse conditions, passengers may be instructed to return to the main cabin and occupy their assigned seats. In some cases, cabin crew may advise those passengers occupying rest compartments to remain there, e.g., until it is determined that passengers may safely return to their seats. Each rest compartment may include a bunk occupyable by a passenger in a prone or reclined position, allowing the passenger to rest or sleep therein. Individual bunks may be arranged within a rest cabin so as to maximize the amount of standard bunks within a rest cabin of a given size (e.g., equivalent in volume to a standard cargo compartment) without truncating the size of any individual bunk. For example, two or more bunks may be stacked atop each other within a rest cabin. Individual bunks may be disposed at a fixed angle to others, e.g., substantially parallel or perpendicular to the longitudinal axis (roll axis) of the aircraft. Alternatively, individual bunks may be arranged longitudinally on either side of a central aisle, by which each bunk may be accessed.

It is contemplated that cabin crew may not be physically present to monitor rest cabins in person, although some rest cabins may be configured to include a seating element temporarily occupyable by a crewmember. The rest cabins may be monitored remotely by cabin crew on the main deck, who may be alerted if conditions therein merit a response. For example, "rough" or low-resolution infrared sensors may monitor the rest cabin and individual compartments without intruding upon the privacy of occupying passengers, while visual cameras may monitor common areas of the rest cabin. Sensors and/or cameras may monitor the presence or absence of passengers, movement, and heat signatures, alerting the cabin crew if conditions warrant. If, for example, conditions consistent with an unauthorized presence (e.g., a passenger is present within a rest cabin or rest compartment when s/he should not be), an altercation between passengers, adverse environmental conditions, a medical emergency (e.g., as determined by anomalous movement of a given passenger over time), or a potential fire (e.g., excessive heat persisting over time) are detected, the crew may be alerted or summoned to the rest cabin depending upon the severity of the scenario. Rest cabins may incorporate preventative safety measures in order to prevent or reduce the risk of such emergency scenarios. For example, as the charging of mobile devices (in particular, the rechargeable batteries of cellular phones or tablets) may contribute to the risk of onboard fire, charging devices (e.g., inductive wireless charging devices) may be provided for passengers occupying the rest cabin within a fireproof enclosure, such that a device may not be charged unless placed therein. Such fireproof charging facilities may be placed proximate to an infrared sensor for added safety. Similarly, portable fire containment bags (FCB) will be securely stored throughout the overhead and lower lobe rest cabins for the containment of any mobile devices or batteries thereof determined to be at risk of combustion. Infrared temperature sensors may further be positioned to cover the whole of the common area (e.g., shared spaces or common access corridors). The temperature sensors, in concert with onboard smoke detectors, may determine not only the presence of a fire, but its location, such that cabin crew may respond quickly and passengers evacuated to the main cabin by unobstructed routes.

Each bunk may incorporate a privacy partition and may be equipped with safety features comparable to a main-deck seat, such as a safety belt and deployable oxygen mask, as well as a passenger service unit (PSU) incorporating a positionable reading light, call button, panic button, and adjustable gasper outlet. Each rest compartment may further include a two-way audio connection so that the occupant may communicate with cabin crew. Rest compartments may incorporate work surfaces that fold out or down into the compartment from the wall or ceiling for the temporary use of occupants. As individual rest compartments may lack a physical window, the compartments may incorporate a "virtual window", whereby a display surface connected to exterior cameras or image sensors provides attitude cues to the occupant via externally captured images. The display surface may be embedded into the compartment wall or pivotably attached, such that a single display surface may serve as a virtual window while substantially flush with the wall but may be pivoted out or down for access to the inflight entertainment system.

A passenger rest cabin incorporated into the overhead crown area may be modular (e.g., comprising one or more connected or linked modules), such that the size of the rest cabin may be scaled up or down depending on the size of the embodying aircraft or the desired number of rest compartments. Similarly, one or more modular overhead rest compartments may be easily installed into the aircraft during an outfit or refit, with portions of the modular overhead passenger rest cabins dedicated to electrical, ventilation, or other service connections between modules. The overhead passenger rest cabin may be proportioned to maximize the available space for individual rest compartments and access corridors while minimally intruding upon the space of main cabin passengers. For example, in order to maximize the height of the overhead cabin access corridor, the main cabin ceiling may be lowered, e.g., over the centermost seats. Similarly, main cabin lavatories may be "notched", or partially reduced in height or truncated, to accommodate the overhead passenger rest cabin.

As noted above, it is contemplated that the overhead passenger rest cabin will not be occupied by passengers during any flight segment, or under any conditions, where immediate evacuation of the aircraft may be necessary (e.g., TTL phases or periods of excessive turbulence or other adverse environmental conditions). Accordingly, the overhead passenger rest cabin may be equipped with bi-directional hatches deployable into an aisle of the main cabin. For example, should conditions within the overhead cabin warrant the evacuation of passengers or the rapid intervention of cabin crew, the bi-directional hatches may include access ladders that deploy downward into the main cabin. Passengers may rapidly exit the overhead cabin, and cabin crew may likewise rapidly ascend into the overhead cabin, via the access ladders. Bi-directional hatches may be easily deployable by passengers; e.g., a single lever or button may release the access ladder from its restraints while activating any necessary emergency lights or warnings.

The overhead passenger rest cabins, as noted above, may incorporate individual rest compartments situated along either side of a central corridor and accessible therefrom. It is contemplated that due to the limited interior space available for incorporating the overhead passenger rest cabin into an aircraft interior while minimally intruding upon main cabin space, the central access corridor may be of limited height, such that passengers of average size may not be able to traverse the access corridor without crouching to some extent. Accordingly, the central access corridor may incorporate handholds at regular intervals therealong, sized and placed to reduce strain associated with remaining in a crouched position while traversing the corridor. Similarly, the access corridor may include shifts in lighting or ventilation along its length to prevent claustrophobia; transitional spaces may be positioned along the corridor to "break up" the space.

Similarly to the overhead crown rest cabin, the lower lobe rest cabins may be modular in nature. For example, the lower lobe rest cabins may be sized and shaped to match the proportions of a cargo container, such that one or more such rest cabins may be easily incorporated into the lower cargo deck. The modular rest cabins may likewise include dedicated entry and exit portals and electrical, airflow, and other service connections therebetween, such that the overall amount of available lower lobe bunk space may be scaled up or down as needed or desired. For example, passengers may descend into a first lower lobe rest cabin, which may include transitional space and/or temporary crew seating facilities, and pass therefrom into successive rest cabins through the entry and exit portals. Lower lobe rest cabins may include additional ceiling hatches deployable if rapid evacuation of the rest cabins upward into the main cabin is necessary. In some embodiments, lower lobe rest cabins may include modular pairs of interconnected rest cabins. For example, a first cabin and a second cabin may be interconnected such that a first space within the first cabin and a second adjoining space within the second cabin may be combined into a full size rest compartment or bunk shared between the two cabins, where neither the first space nor the second space would alone be large enough to accommodate a full rest compartment.

Additionally or alternatively, embodiments of the inventive concepts disclosed herein are directed to a passenger aircraft incorporating additional reserved spaces adjacent to, and accessible from, selected lay-flat or tracked aircraft seats. For example, first-class, business-class, or equivalent passengers may be assigned main-deck seats capable of tracking backward or forward, or of reconfiguration into a lay-flat state whereon the passenger may occupy the seat in a prone position. Such lay-flat seats or tracking mechanisms may conceal a hatch set into the main deck floor, whereby the occupying passenger may access a private or semi-private compartment, e.g., on the cargo deck immediately below the main deck. Said private or semi-private compartment (e.g., two adjacent seats may share a compartment) may provide an alternative seating area or bunk area for the passenger while preserving available space on the main deck for other seating facilities; compartments may be windowless but equipped with "virtual windows" as described above.

Referring to FIG. 1, an exemplary embodiment of a passenger aircraft 100 according to the inventive concepts disclosed herein may include overhead passenger rest cabins 102 and lower lobe passenger rest cabins 104. For example, the aircraft 100 may include only overhead passenger rest cabins 102, only lower lobe passenger rest cabins 104, or both. Overhead passenger rest cabins 102 may be incorporated into the overhead crown area of the aircraft 100, above the main passenger cabin 106 (e.g., main deck) and the passenger seats (108), overhead bins (110), and monuments (112) (e.g., storage monuments, galley monuments, audiovisual monuments housing an inflight entertainment system, lavatories). Lavatories, monuments 112, zone dividers, or other structures proximate to the longitudinal center of the main passenger cabin 106 may be notched or otherwise modified to accommodate the overhead passenger rest cabin 102. Similarly, lower lobe passenger rest cabins 104 may be incorporated on a cargo deck directly underneath the main passenger cabin 106. Passengers may access the overhead passenger rest cabins 102 or lower lobe passenger rest cabins 104 via an entry vestibule (114) located within the main passenger cabin 106.

The entry vestibule 114 may connect the overhead passenger rest cabins 102 and the lower lobe passenger rest cabins 104 (when both are incorporated within the aircraft 100) while providing a separate path for passengers to access each rest cabin from the main passenger cabin 106 (e.g., via ascending or descending staircases). It is contemplated that the entry vestibule 114 will be the primary means of passenger access to the overhead passenger rest cabins 102 and the lower lobe passenger rest cabins 104, and the sole means of access during non-emergency conditions. In some embodiments, the entry vestibule 114 may be located at the aft end of the overhead passenger rest cabin 102, and an auxiliary vestibule (114a) may provide a secondary entrance and exit to and from the main passenger cabin 106 and the overhead passenger rest cabin 102. The overhead passenger rest cabins 102 may include additional escape hatches (not shown) providing an emergency escape route (e.g., to main aisles (116) of the main passenger cabin 106) for passengers to rapidly exit the overhead passenger rest cabins. The lower lobe passenger rest cabins 104 may similarly include escape hatches for emergency return to the main passenger cabin 106. In some embodiments, the aircraft 100 may incorporate additional lower lobe rest compartments (118) situated on the lower cargo deck. For example, the additional lower lobe rest compartments may be located substantially underneath selected partitioned premium seats (120) or premium compartments (122) in premium seating sections of the aircraft 100 and accessible to the occupants of said premium seats or premium compartments (e.g., during safe cruising segments) via proximate hatches in the main deck floor.

Figure 2:
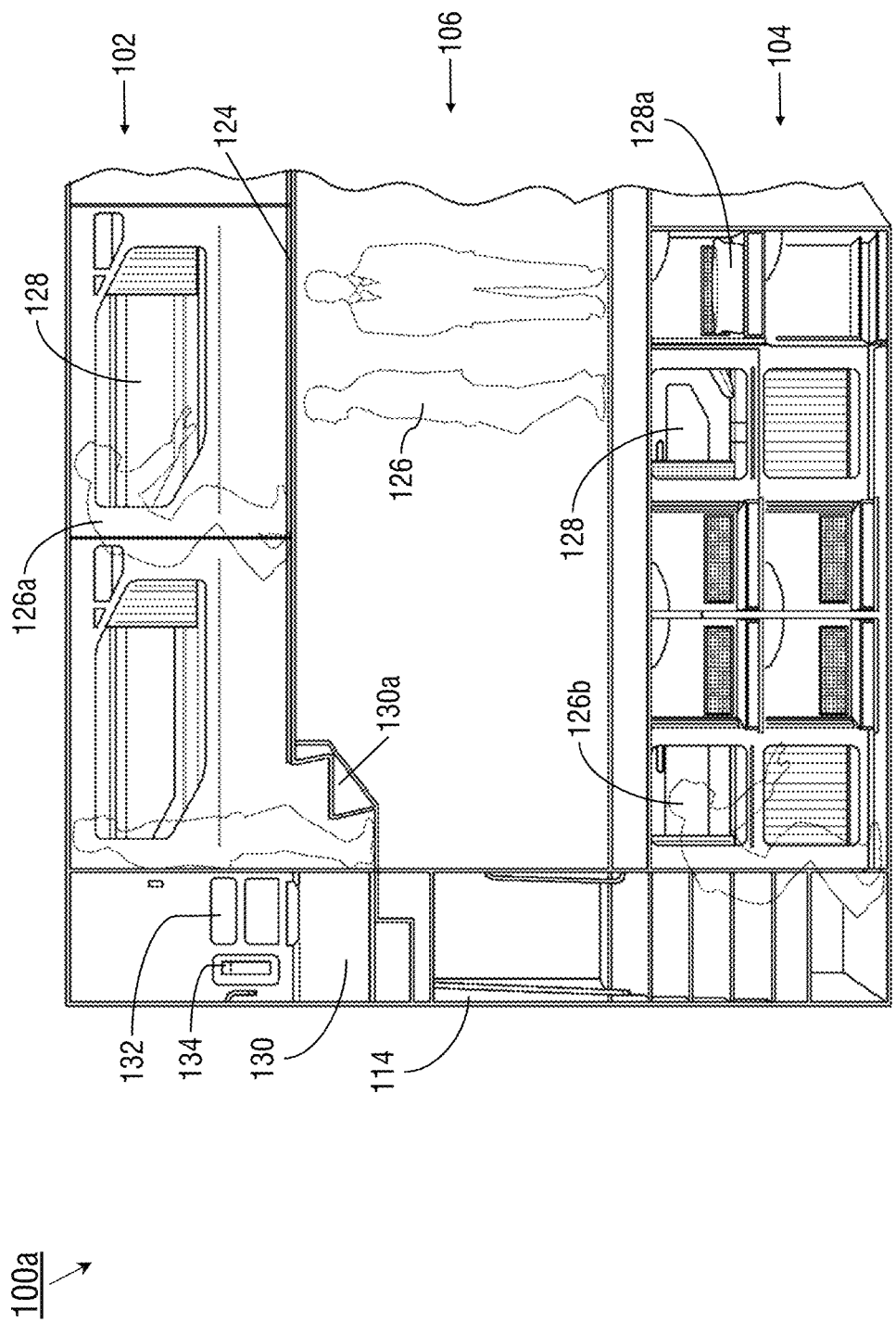
FIG. 2 is a partial cross-section view of the aircraft of FIG. 1.

Referring to FIG. 2, the passenger aircraft 100a may be implemented and may function similarly to the aircraft 100 of FIG. 1, except that the aircraft 100a may include an overhead passenger rest cabin 102 and a lower lobe passenger rest cabin 104 connected by an entry vestibule 114 to the main passenger cabin 106. For example, the overhead passenger rest cabin 102 may be incorporated into remote space above the main passenger cabin 106 such that the floor of the central corridor (124) of the overhead passenger rest cabin corresponds substantially to the ceiling of the main passenger cabin 106 (e.g., over the centermost portion of the main cabin). The height of the overhead passenger rest cabin 102 that a passenger (126) of average height may remain comfortably standing, e.g., in a main aisle (118, FIG. 1) of the main passenger cabin. However, space limitations within the aircraft 100a may require passengers (126a-b) respectively traversing the overhead passenger rest cabin 102 and lower lobe passenger rest cabin 104 to do so in a partially crouched position. The overhead passenger rest cabin 102 may include individual passenger rest compartments (128) or bunks extending along either side of the central corridor 124, substantially parallel to the longitudinal or roll axis of the aircraft 100a. The overhead passenger rest cabin 102 may include a transitional space (130) between the entry vestibule 114 and the central corridor 122; the transitional space may include emergency equipment storage (132) and an emergency handset (134) for communicating with the cockpit or cabin crew, or additional steps (130a) linking the entry vestibule and the central corridor. Similarly, the lower lobe passenger rest cabin 104 may incorporate individual passenger rest compartments 128 aligned substantially parallel to the roll axis as well as passenger rest compartments (128a) aligned at an angle to the roll axis, e.g., perpendicular to the roll axis or substantially parallel to the pitch axis of the aircraft 100a.

Figure 3A:
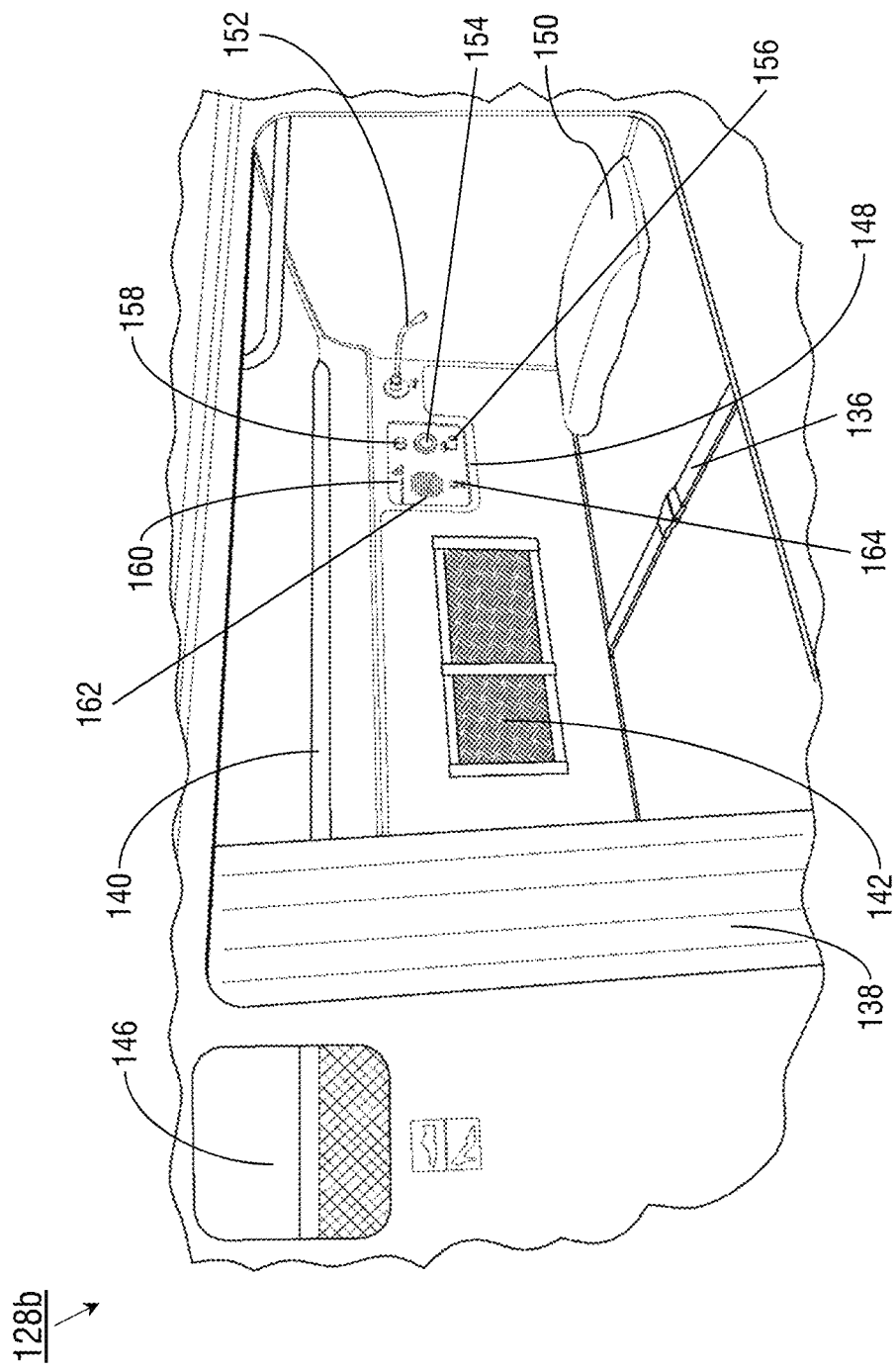
FIGS. 3A and 3B are respectively head-end and foot-end isometric views of a passenger rest compartment of the aircraft of FIG. 1.
Figure 3B:
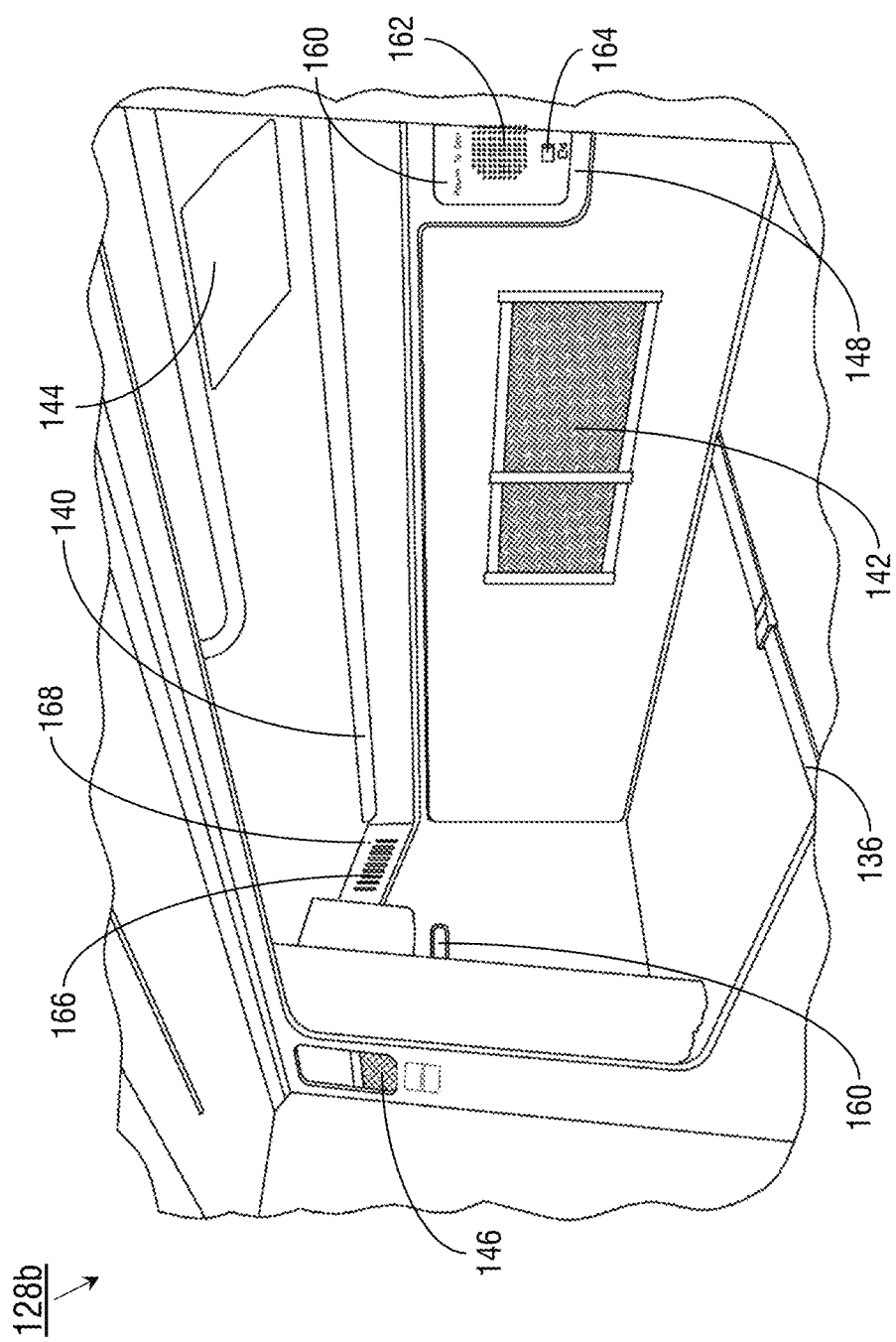

Referring to FIGS. 3A and 3B, the passenger rest compartment 128b (bunk) may be implemented and may function similarly to the passenger rest compartments 128, 128a of FIG. 2, except that the passenger rest compartment 128b may include a safety belt 136, a privacy partition 138 (e.g., privacy curtain), ambient lighting 140, interior stowage compartments 142, an emergency oxygen drop 144, ventilated shoe stowage compartments 146 (which may, for example, be situated or accessed immediately outside or adjacent to the rest compartment), and a passenger service unit 148 (PSU). For example, the PSU 148 may be positioned proximate to the head end of the rest compartment 128b (e.g., where a pillow 150 may be provided for the passenger's head). The PSU 148 may include a positionable reading light 152 and gasper outlet 154, temperature controls 156, a crew call button 158, lighted signage 160 (e.g., signaling the occupying passenger to return to his/her seat, fasten his/her safety belt 136, no smoking). The PSU may further include a speaker/microphone 162 and call button 164 allowing two-way audio communication between the occupying passenger and the cabin crew. Referring in particular to FIG. 3B, the foot end of the passenger rest compartment 128b may include an air return 166 and infrared sensors 168.

Referring to FIG. 4, the lower lobe passenger rest cabin 104a may be implemented and may function similarly to the lower lobe passenger rest cabin 104 of FIG. 2, except that the lower lobe passenger rest cabin 104a may be accessed by a descending staircase (170) connecting the lower lobe passenger rest cabin to the entry vestibule (114, FIG. 2) and thereby to the main passenger cabin (106, FIG. 2). For example, the staircase 170 may descend into the center of the lower lobe passenger rest cabin 104a at a predetermined angle. The passenger rest compartments 128c-e may be implemented and may function similarly to the passenger rest compartments 128b of FIGS. 3A/B, except that the passenger rest compartments 128c, 128 e and the passenger rest compartment 128d may be respectively oriented substantially parallel or at an angle to (e.g., substantially perpendicular to) the longitudinal/roll axis of the aircraft (100, FIG. 1) and positioned around the perimeter of the lower lobe passenger rest cabin 104a. The passenger rest compartments 128d may be positioned in substantially vertical stacks of two or more bunks, depending on the height of the bunks relative to the height of the lower lobe passenger rest cabin 104a. The passenger rest compartment 128e, for example, may be stacked atop the passenger rest compartment 128c in a staggered fashion, set back from the passenger rest compartment 128 by a shelf (172). For example, the passenger rest compartment 128e may combine space from two adjacent modular lower lobe passenger rest cabins 104a, where neither rest cabin on its own may include sufficient space for a full passenger rest compartment. Lower lobe passenger rest cabins 104, 104a may be proportioned for a form factor compatible with standard cargo containers; individual lower lobe passenger rest cabins may be palletized or otherwise capable of addition to, or removal from, the aircraft 100 via the existing cargo loading/unloading system. Further, depending on size, configuration, and desired capacity, the aircraft 100 may incorporate lower lobe passenger rest cabins (104a) either forward or aft of the lower lobe passenger rest cabin 104 connected to the main passenger cabin 106 via the entry vestibule 114.

Figure 5:
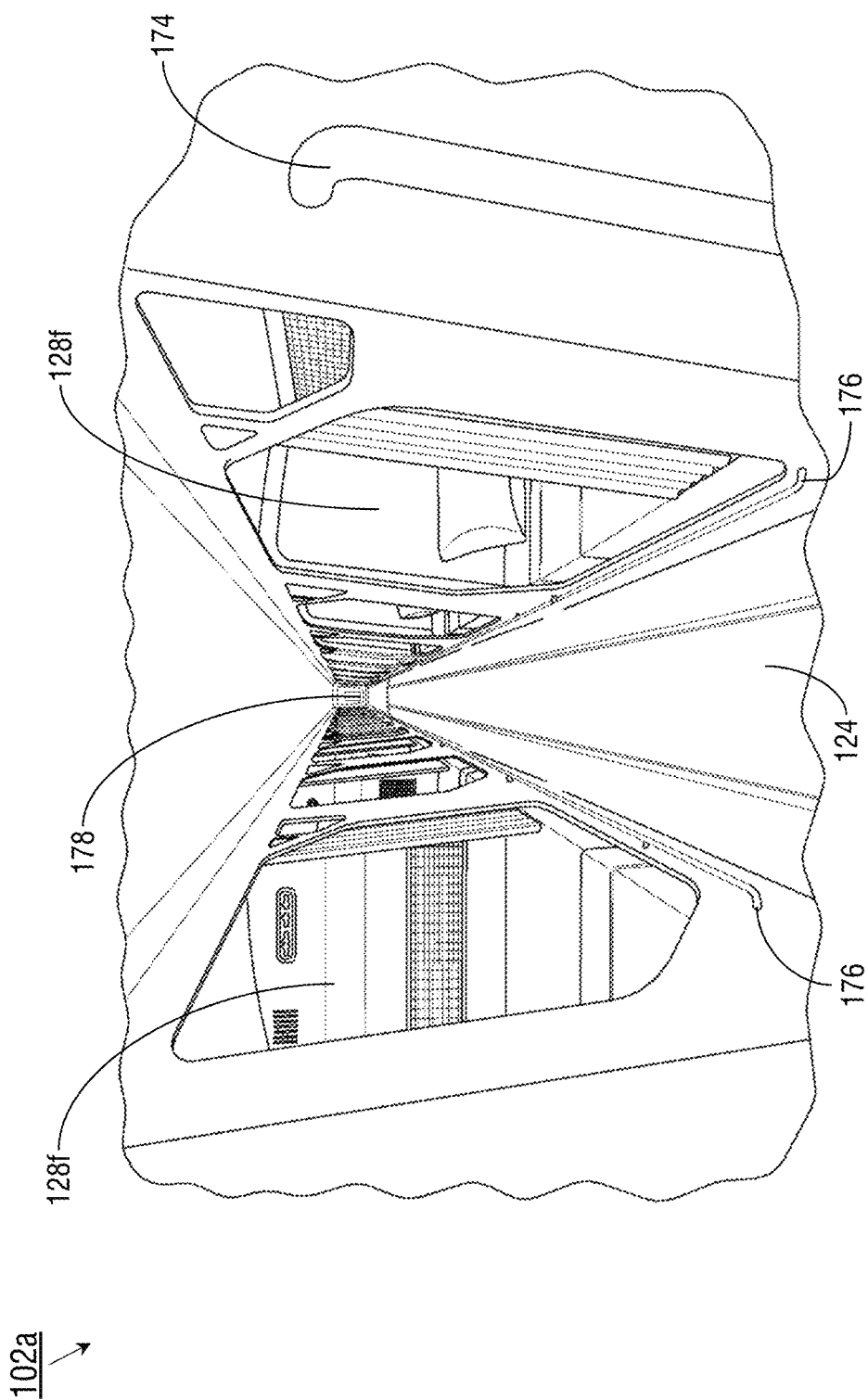
FIG. 5 is a partial longitudinal view of an overhead passenger rest cabin of the aircraft of FIG. 1.

Referring to FIG. 5, the overhead passenger rest cabin 102a and individual rest compartments 128f may be implemented and may function similarly to the overhead passenger rest cabin 102 of FIG. 2 and the individual rest compartments 128c-e of FIG. 4, except that the individual passenger rest compartments 128f of the overhead passenger rest cabin 102a may be sequentially arranged along either side of the central corridor 124 extending forward (e.g., substantially parallel to the longitudinal/roll axis of the aircraft (100, FIG. 1). For example, the overhead passenger rest cabin 102a may comprise twenty (20) passenger rest compartments 128f: ten compartments on the port side of the central corridor 124 and ten opposite compartments on the starboard side. The transitional space (130, FIG. 2) between the entry vestibule (114, FIG. 2) and the overhead passenger rest cabin 102a may include handles (174) graspable by cabin crew or passengers entering the overhead passenger rest cabin via the entry vestibule. Further, graspable handles (176) may be spaced along the central corridor 124; passengers (126a, FIG. 2) traversing the central corridor (e.g., after entering the overhead passenger rest cabin 102a via the entry vestibule 114 and proceeding to their assigned passenger rest compartment 128f) may use the graspable handles to reduce strain while traversing the central corridor in a crouched position. A crew station 178 may be located at the forward end of the overhead passenger rest cabin 102 (including, e.g., emergency storage for first aid and fire containment supplies, communications facilities, and/or temporary jump seating). Similar crew stations may be located within the transitional space (130, FIG. 2) at the aft end of the overhead passenger rest cabin 102 and throughout the lower lobe passenger rest cabin (104, FIG. 4; e.g., proximate to the staircase or the point at which the entry vestibule 114 enters the lower lobe passenger rest cabin).

Figure 6A:
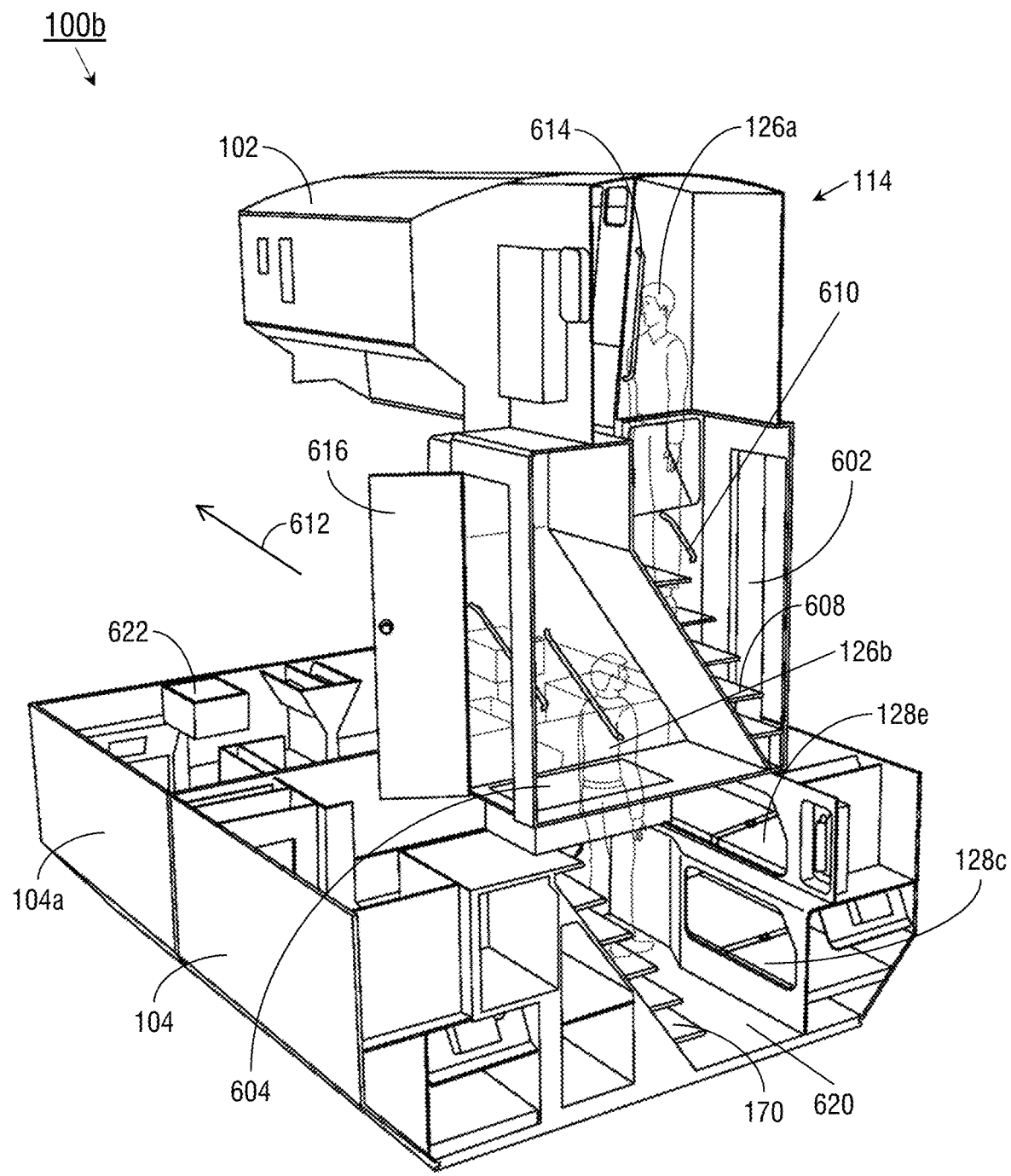
FIGS. 6A and 6B are respectively isometric and forward cross-section views of a bi-directional vestibule of the aircraft of FIG. 1.

FIGS. 6A/B—Entry Vestibule, Opposing Chambers

Figure 6B:
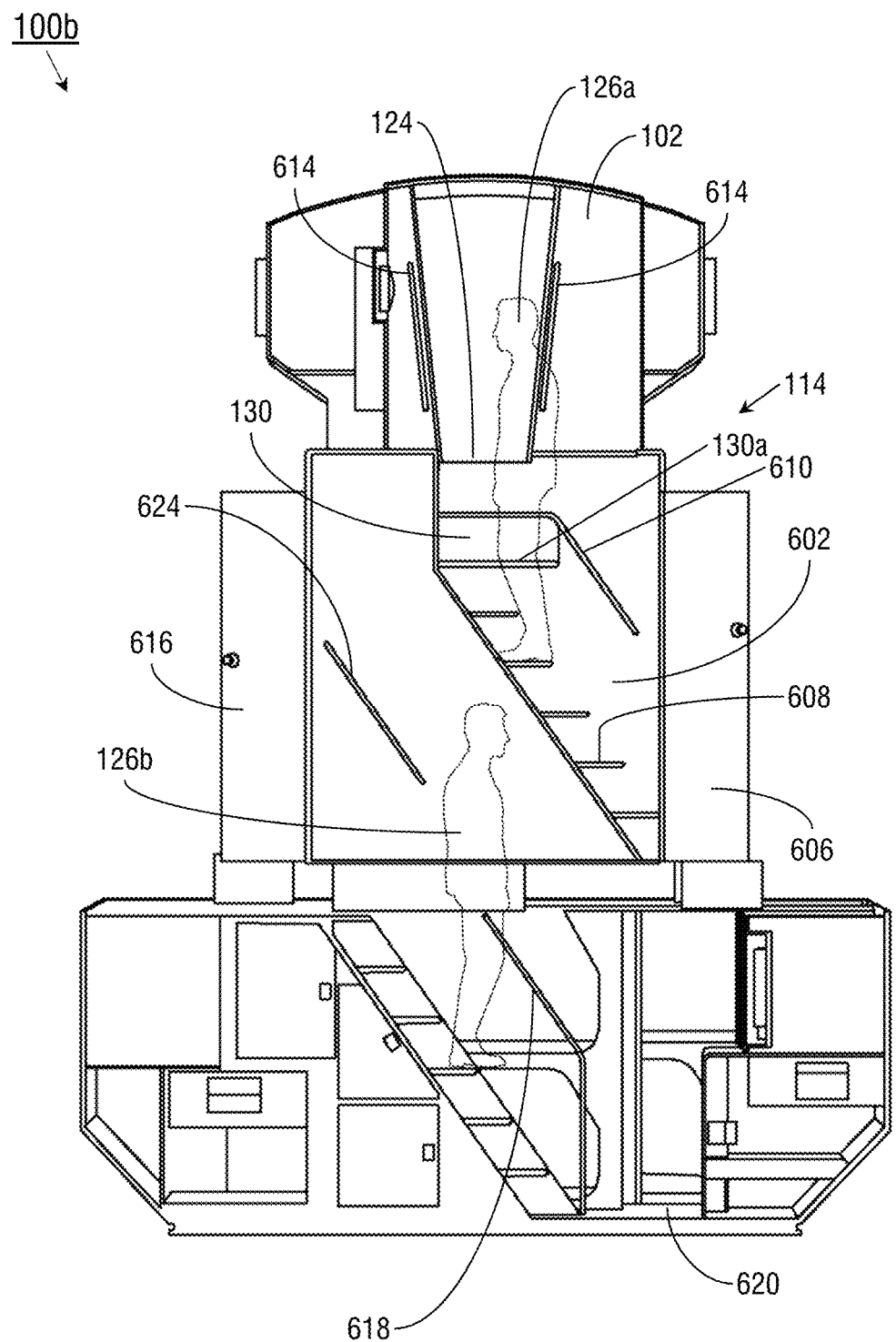

Referring to FIGS. 6A and 6B, the aircraft 100b may be implemented and may function similarly to the aircraft 100a of FIG. 2, except that the entry vestibule 114 of the aircraft 100b may incorporate an ascent chamber 602 and a descent chamber 604. For example, the ascent chamber 602 may allow passengers (126a) to access the overhead passenger rest cabin 102 from the main passenger cabin (106, FIG. 2). The ascent chamber 602 may be accessible from a main aisle (116, FIG. 1) via an access door (606) opening into the main aisle. The access door 606 may be locked by cabin crew to prevent unauthorized access to the entry vestibule 114 and overhead passenger rest cabin 102 from the main passenger cabin 106, e.g., access by passengers (126a) during taxi, takeoff and landing (TTL) flight segments or access by unauthorized personnel while the aircraft 100b is parked at a gate. However, cabin crew may be able to unlock the access door 606 and rapidly gain entry to the overhead passenger rest cabin 102, e.g., in the event of an emergency. Similarly, the access door 606 may allow passengers or crew to exit the overhead passenger rest cabin via the entry vestibule 114, even if the access door is otherwise inaccessible from the main passenger cabin. In some embodiments, the entry vestibule 114 may include an ascent chamber 602 and a descent chamber 604 accessible via a single access door 606.

The ascent chamber 602 may include a staircase (608) and a handrail (610) for use by passengers (126a) entering the overhead passenger rest cabin 102. The ascent chamber 602 may additionally or alternatively may include a ladder or other like means of ascent capable of incorporation into the ascent chamber. The staircase 608 may terminate in a transitional space 130 by which the passenger 126a may enter the central corridor 124 of the overhead passenger rest cabin 102. For example, the transitional space 130 may include one or more transitional steps 130a leading into the central corridor 124. The central corridor 124 may proceed forward (612) from the entry vestibule 114 in a substantially longitudinal direction (e.g., parallel to the longitudinal or roll axis of the aircraft 100b). The staircase 608 may ascend from the main passenger cabin 106 to the transitional space 130 in a substantially lateral direction, e.g., parallel to a lateral or pitch axis of the aircraft 100b. The transitional space 130 may include additional handrails 614 graspable by the passenger 126a while entering into the central corridor 124 from the transitional steps 130a.

Similarly, the descent chamber 604 may include an access door 616 accessible from the main passenger cabin 106 as well as a descending staircase (170) or similar means of descent (e.g., a ladder) by which passengers (126b) may access the lower lobe passenger rest cabin 104 therefrom. The descending staircase 170 may include handrails 618 for the convenience of the passenger 126b. The descending staircase 170 may terminate in a central area 620 of the lower lobe passenger rest cabin 104, from which the passenger 126b may access individual passenger rest compartments 128c, 128e within the lower lobe passenger rest cabin or enter into an adjacent lower lobe passenger rest cabin (104a) or module. While the adjacent lower lobe passenger rest cabin 104a may not be regularly and directly accessible from the main passenger cabin 106a, additional ceiling hatches 622 may allow passengers 126b to rapidly exit the adjacent lower lobe passenger rest cabin to the main passenger cabin in the event of an emergency.

Figure 7A:
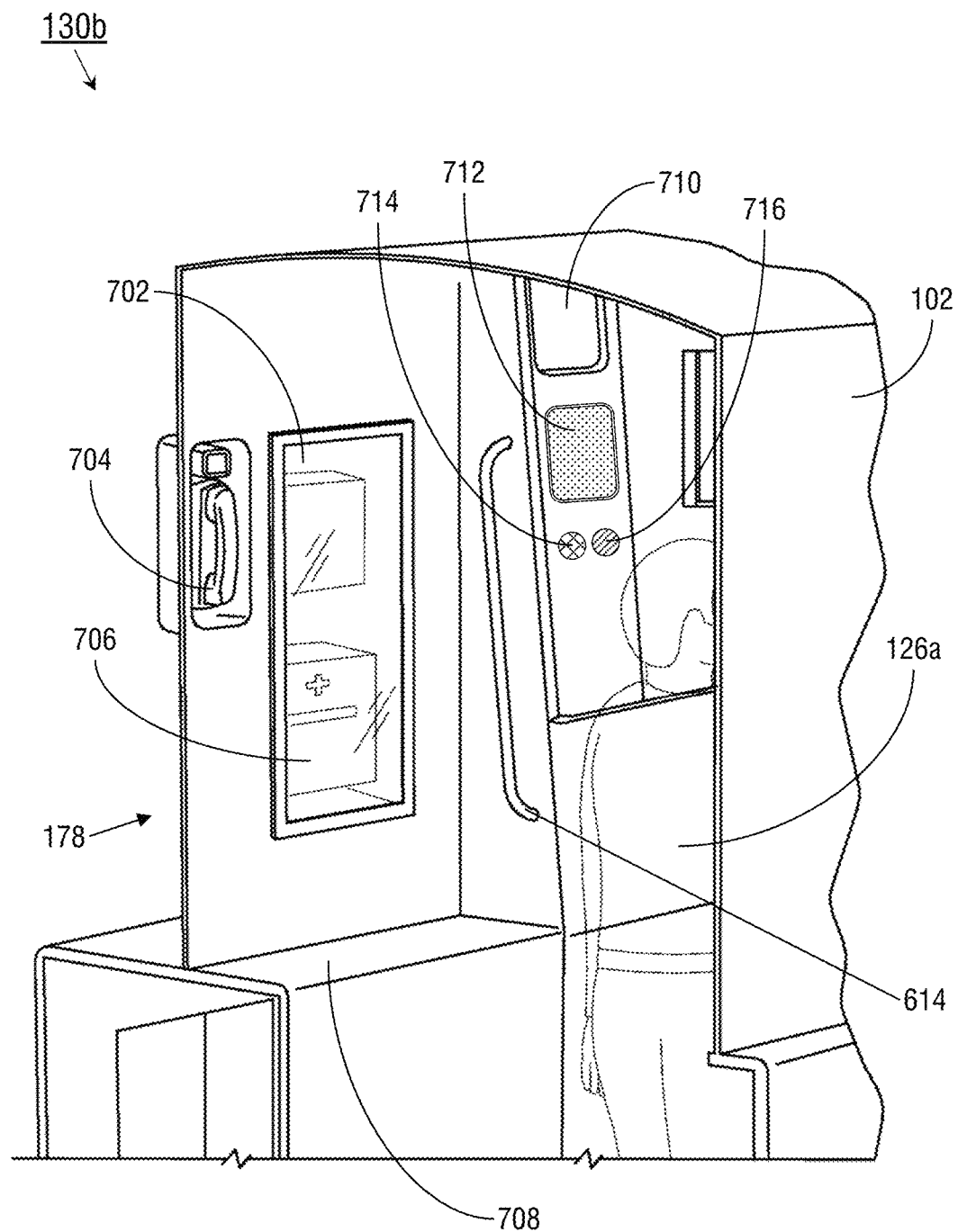
FIG. 7A is an isometric view of a transitional space of the bi-directional vestibule of FIGS. 6A and 6B.

FIGS. 7A/B—Transitional Space

Figure 7B:
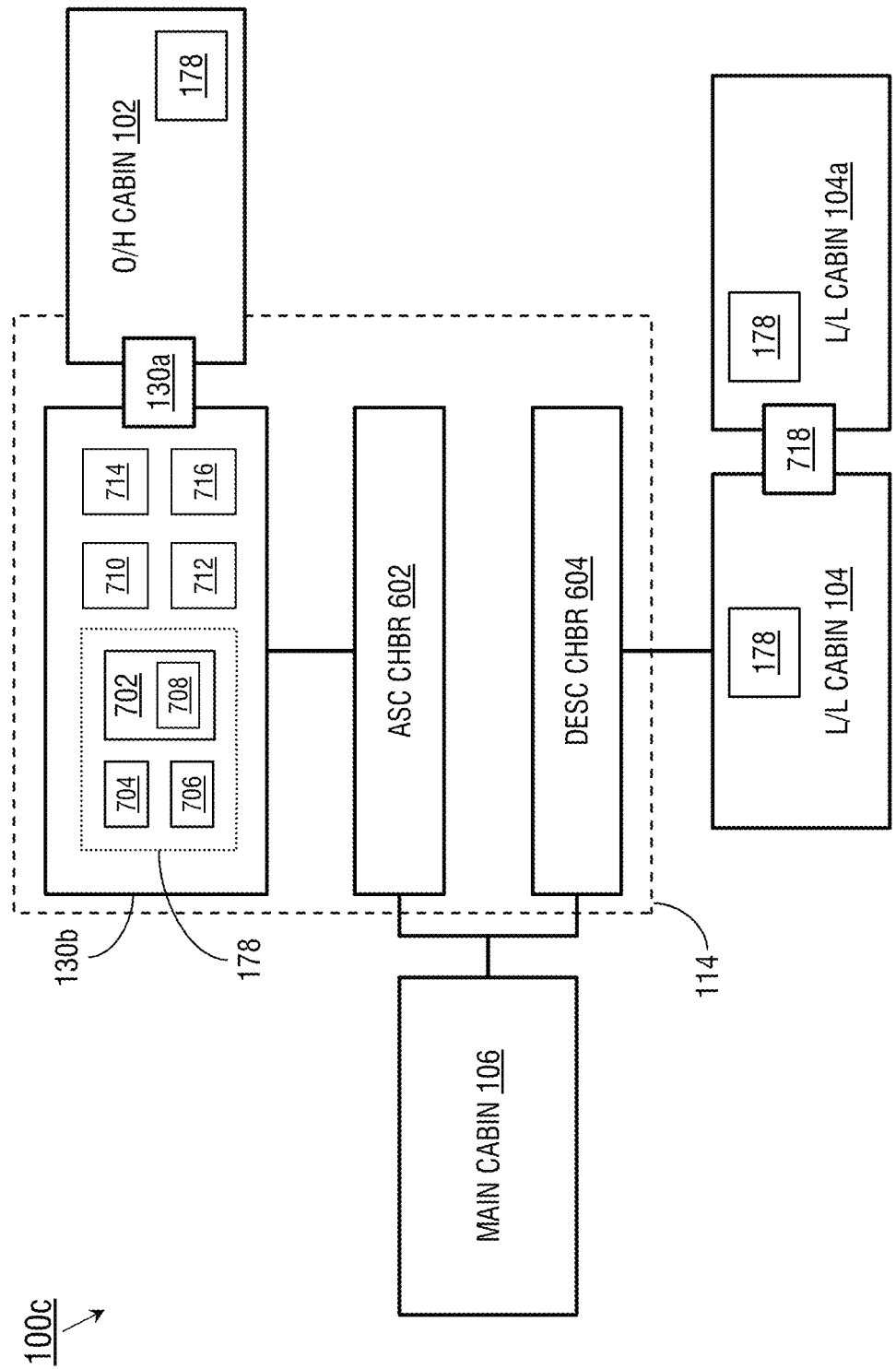
FIG. 7B is a diagrammatic illustration of the bi-directional vestibule of FIG. 7A.

Referring to FIGS. 7A and 7B, the transitional space 130b and the aircraft 100c may be implemented and may function similarly to the transitional space 130 of FIG. 2 and the aircraft 100b of FIGS. 6A and 6B, except that the transitional space 130b may include a crew station 178. The crew station 178 may include one or more storage compartments 702, a handset 704 or other similar communications device, and a deployable (e.g., fold-down) jump seat 706 for the emergency use of cabin crew. For example, passengers (126a) may ascend the staircase (608, FIGS. 6A/B) into the transitional space 130b, facing the crew station 178. Once in the transitional space 130b, the passengers 126a may turn into the overhead passenger rest cabin 102 (perhaps ascending one or more transitional steps 130a, with the assistance of handrails 614). The storage compartments 702 may contain emergency supplies (708; e.g., first aid kits, defibrillators, medical supplies, fire containment supplies) accessible to cabin crew, while the handset 704 may allow crewmembers to communicate with the cockpit or with other crewmembers stationed throughout the main passenger cabin (106, FIG. 2). The jump seat 706 may include a seat belt, harness, or other like safety device for temporarily securing the crewmember into the jump seat.

Further, the transitional space 130b may incorporate one or more sensory preparation systems for the mitigation or alleviation of claustrophobia or other physical and mental stressors in passengers utilizing the overhead passenger rest cabin 102. For example, the transitional space 130b may incorporate any combination of visual, aural, and olfactory preparation systems to modify the immediate environment and ease the transition from the ascent chamber 602 into the overhead passenger rest cabin 102. The transitional space 130b may include a physical window (710), virtual window (712), or active/passive coverings of the wall, floor, or ceiling to provide the ascending passenger 126a views external to the transitional space or the overhead passenger rest cabin 102, e.g., of the main passenger cabin 106 or external to the aircraft 100c. The transitional space 130b may include speakers (714) for the broadcast of noise canceling signals or audio programming. The transitional space 130b may include ventilation outlets (716) for airflow or for the distribution of olfactory stimulating or soothing scents). Additional crew stations 178 may be located at the opposite end of the overhead passenger rest cabin 102 (e.g., in or near the auxiliary entry vestibule (114a, FIG. 2) and in the lower lobe passenger rest cabin 104, proximate to the descent chamber 604, and at the entry portal (718) to each adjacent lower lobe passenger rest cabin 104a.

Figure 8A:
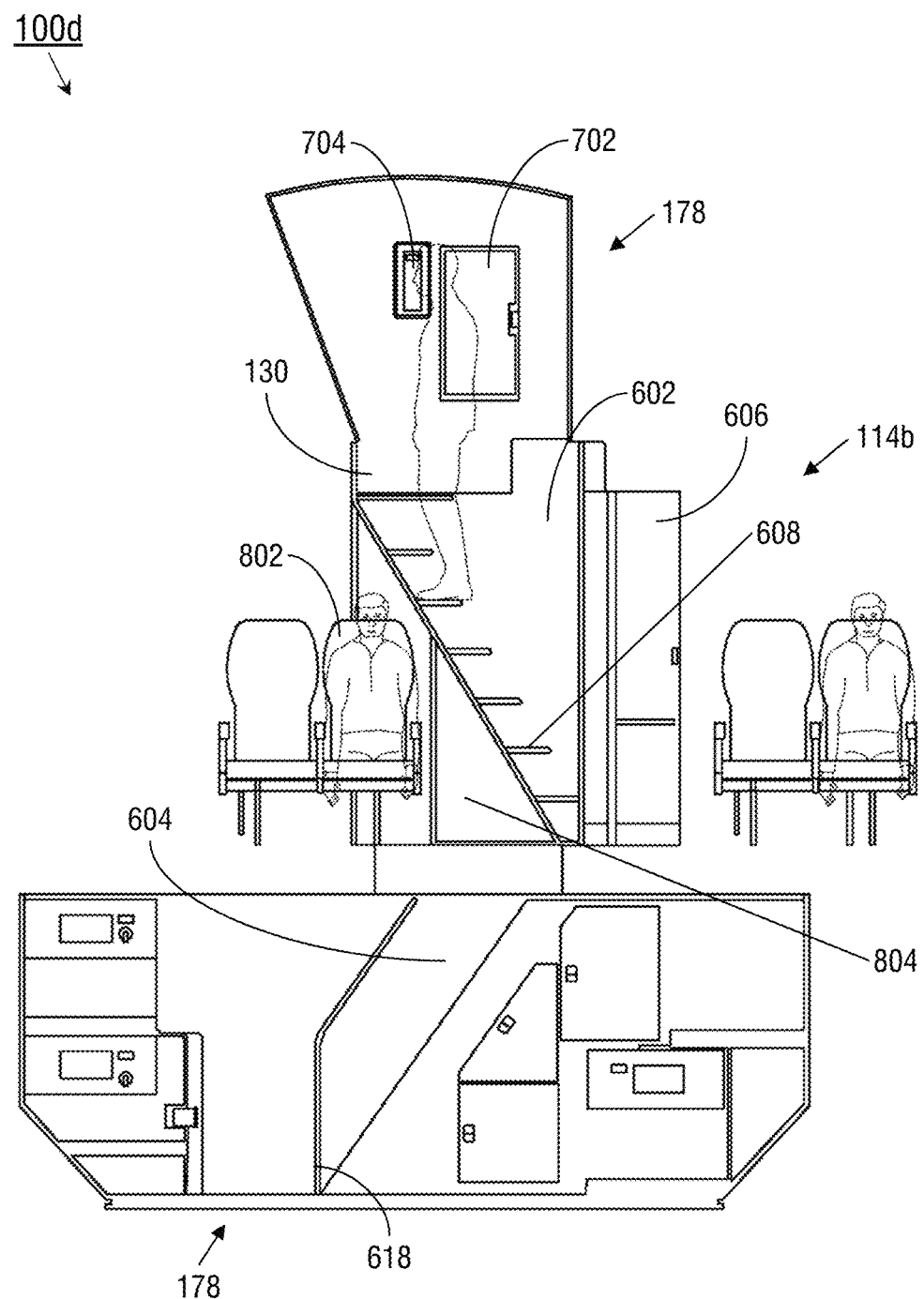
FIGS. 8A and 8B are respectively forward cross-section and isometric views of an alternative bi-directional vestibule of the aircraft of FIG. 1.

FIGS. 8A/B—Entry Vestibule, Adjacent Chambers

Figure 8B:
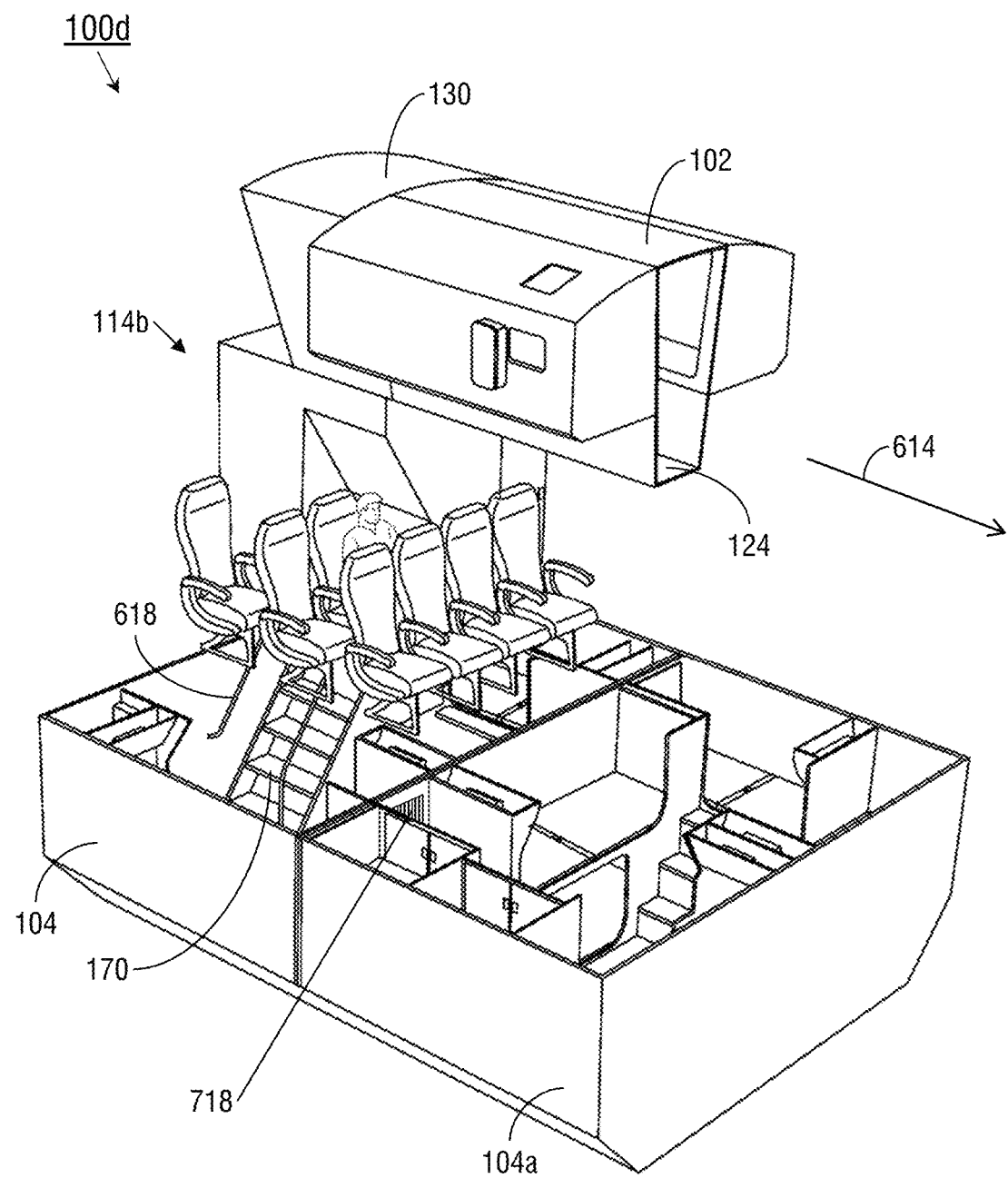

Referring to FIGS. 8A and 8B, the aircraft 100d and entry vestibule 114b may be implemented and may function similarly to the aircraft 100cb and entry vestibule 114 of FIGS. 7A and 7B, except that the entry vestibule 114b of the aircraft 100d may incorporate an ascent chamber 602 directly adjacent to the descent chamber 604. For example FIG. 8A in particular looks aft from the front of the aircraft 100c, the entry vestibule 114b and transitional space 130 aft of the overhead passenger rest cabin 102. The ascent chamber 602 (accessible via the access door 606) may include the ascending staircase 608, allowing the passenger 126a to ascend into the transitional space 130 and then into the overhead passenger rest cabin 102. However, crew stations 178 may be located in the forward and aft ends of the overhead passenger rest cabin 102, the central corridor 124 of the overhead passenger rest cabin proceeding generally forward (614) from the transitional space 130). The descent chamber 604 and descending staircase 170 (assisted by handrails 618) directly aft of the ascent chamber 602 may allow descending passengers (126*b*, FIGS. 6A-B) to enter the lower lobe passenger rest cabin 104 and from there pass through a designated entry portal 718 into one or more adjacent lower lobe passenger rest cabins (104*a*). As the descent chamber 604 is not located directly under the ascent chamber 602 (as may be the case with respect to the entry vestibule 114 of FIGS. 6A and 6B), the aircraft 100*d* may incorporate a main cabin passenger seat (802) fully or partially underneath the ascent chamber. Additionally or alternatively, the aircraft 100*d* may incorporate a storage compartment 804 fully or partially underneath the ascent chamber 602 (and accessible, e.g., through the ascending staircase 608.

Figure 9A:
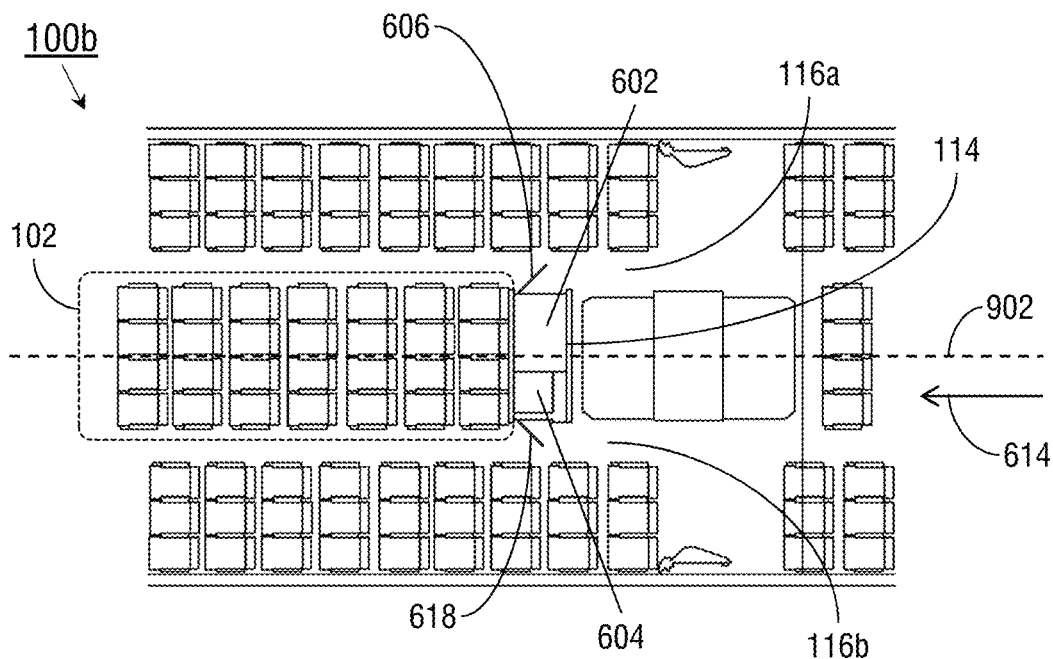
FIG. 9A is an overhead view of the aircraft and bi-directional vestibule of FIGS. 6A and 6B.

FIGS. 9A/B—Overhead View, Opposing Chambers

Referring to FIG. 9A, the aircraft 100*b* of FIGS. 6A and 6B may incorporate the entry vestibule 114 such that the ascent chamber 602 and descent chamber 604 may be accessed from opposite main aisles 116*a-b*. For example, the aircraft 100*b* may be a double-aisle aircraft wherein a port-side main aisle 116*a* and starboard-side main aisle 116*b* extend forward (614) parallel to, and to either side of, the longitudinal or roll axis (902) of the aircraft. Accordingly, the access door 606 may allow access to the overhead passenger rest cabin 102 from the port-side main aisle 116*a* and the access door 618 may allow access to the lower lobe passenger rest cabin (104, FIG. 8A-B) from the starboard-side main aisle 116*b*.

Figure 9B:
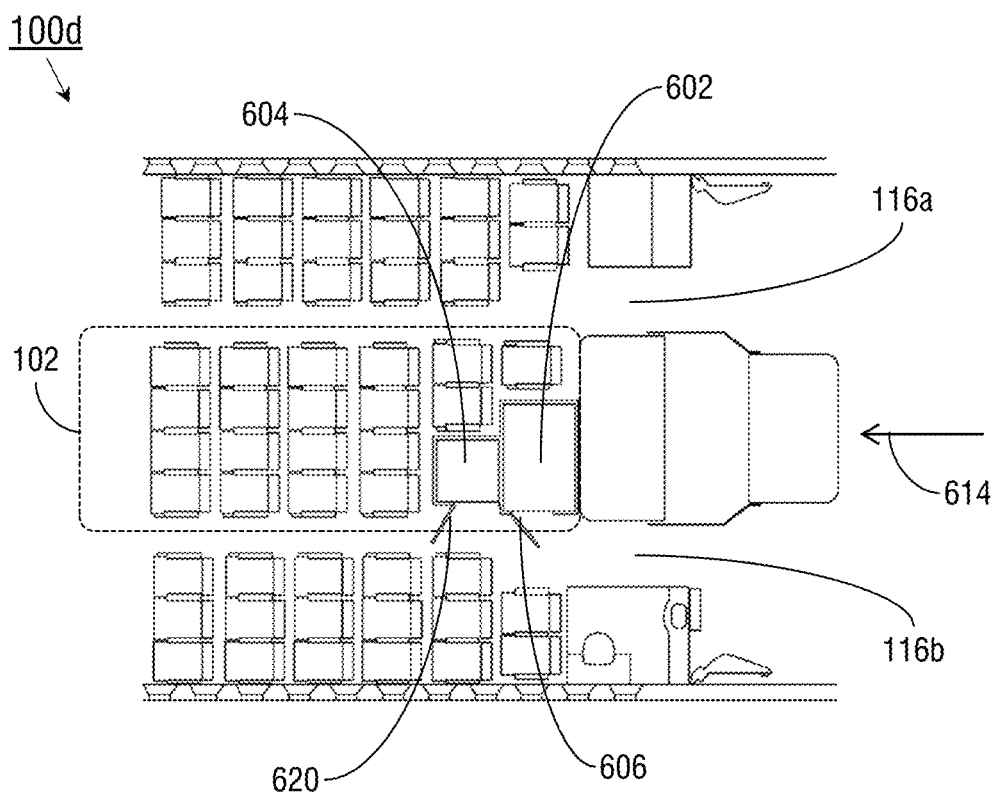
FIG. 9B is an overhead view of the aircraft and bi-directional vestibule of FIGS. 8A and 8B.

Similarly, referring now to FIG. 9B, the aircraft 100*d* of FIGS. 8A and 8B may incorporate the entry vestibule 114*b* such that the ascent chamber 602 and descent chamber 604 may be respectively accessed via adjacent access doors 606, 618 from a single main aisle 116*b*. The aircraft 100*c* may be a single-aisle aircraft, or the aircraft 100*c* may be a double-aisle aircraft wherein both access doors 606, 618 open into the starboard-side main aisle 116*b* (or, alternatively, into the port-side main aisle 116*a*). The access door 606 to the ascent chamber 602 (via which the overhead passenger rest cabin 102 may be accessed) may be directly forward (614) of the access door 618 to the descent chamber 604 (via which the lower lobe passenger rest cabin (104, FIGS. 8A-B) may be accessed). In some embodiments, the ascent chamber 602 and the descent chamber 604 may be accessed via the same single access door 606.

As will be appreciated from the above, systems and methods according to embodiments of the inventive concepts disclosed herein may provide passengers with simultaneous access to both overhead and lower lobe passenger rest cabins, without access to one being impeded by access to the other. Further, transitional spaces may alleviate stressors on passengers associated with entering, traversing, and occupying compact rest cabins. Finally, such simultaneous and safe access to passenger rest cabins may be provided in a way that minimally disrupts passenger seating and available space within the main passenger cabin or main deck.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A bidirectional entry vestibule for a passenger aircraft, comprising:
    a first enclosed chamber configured for integration into a main passenger cabin of an aircraft, the first enclosed chamber enclosing an ascent means capable of providing at least one passenger access to an overhead passenger cabin disposed above the main passenger cabin;
    a second enclosed chamber configured for integration into the main passenger cabin, the second enclosed chamber enclosing a descent means capable of providing the at least one passenger access to a lower passenger cabin disposed within a lower lobe area of the aircraft below the main passenger cabin;
    at least one transtional space connecting the first enclosed chamber to the overhead passenger cabin;
    at least one sensory preparation system configured to modify an environment of the transitional space, the sensory preparation system including at least one of a physical window and a virtual window;
    and
    at least one access door accessible from the main passenger cabin, the first enclosed chamber and the second enclosed chamber accessible via the access door.

2. The bidirectional entry vestibule of claim 1, wherein the transitional space includes a crew station, the crew station including at least one of a storage compartment, a communications device, and a deployable jump seat capable of accommodating a crewmember of the aircraft, the jump seat including at least one safety device configured to secure the crewmember in the jump seat.

3. The bidirectional entry vestibule of claim 2, wherein the crew station is a first crew station, further comprising:
    at least one second crew station disposed within the lower passenger cabin proximate to the descent means.

4. The bidirectional entry vestibule of claim 1, wherein the sensory preparation system includes a visual preparation system configured to modify a visual environment of the transitional space.

5. The bidirectional entry vestibule of claim 1, wherein the sensory preparation system includes at least one aural preparation system configured to modify an aural environment of the transitional space.

6. The bidirectional entry vestibule of claim 1, wherein the sensory preparation system includes at least one olfactory preparation system configured to modify an olfactory environment of the transitional space.

7. The bidirectional entry vestibule of claim 1, wherein the ascent means includes at least one of an ascending staircase and an ascending ladder.

8. The bidirectional entry vestibule of claim 1, wherein the descent means includes at least one of a descending staircase and a descending ladder.

9. The bidirectional entry vestibule of claim 1, wherein the ascent means and the descent means are aligned substantially parallel to a lateral or pitch axis of the aircraft.

10. The bidirectional entry vestibule of claim 1, wherein the at least one access door comprises a first access door and a second access door, the first enclosed chamber accessible via the first access door and the second enclosed chamber accessible via the second access door.

11. The bidirectional entry vestibule of claim 1, wherein the first access door and the second access door open into, and are accessible from, a first aisle of the aircraft.

12. The bidirectional entry vestibule of claim 11, wherein the second door is disposed adjacent to the first door.

13. The bidirectional entry vestibule of claim 1, wherein:
   the first door opens into and is accessible from a first aisle of the aircraft; and
   the second door opens into and is accessible from a second aisle of the aircraft, the second aisle substantially parallel to the first aisle.

14. The bidirectional entry vestibule of claim 1, further comprising:
   at least one storage compartment disposed beneath the first enclosed chamber.

* * * * *